Nov. 16, 1971  K. R. WELLS  3,619,998
HANDLE HEIGHT ADJUSTMENT
Filed Feb. 9, 1970  2 Sheets-Sheet 1
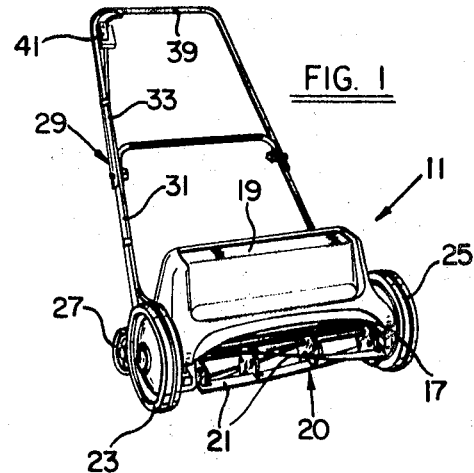
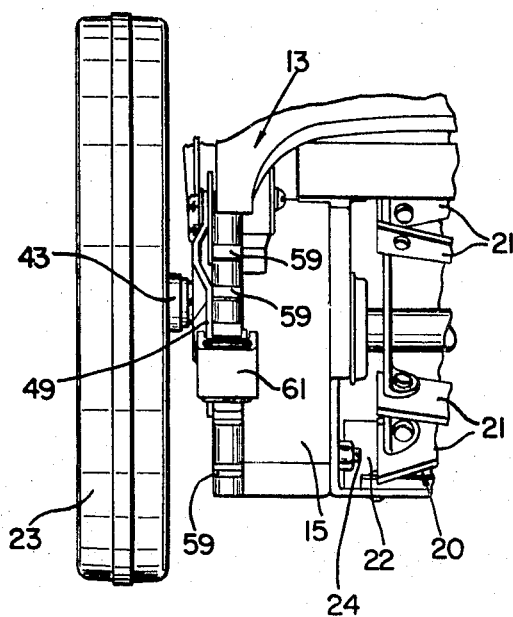
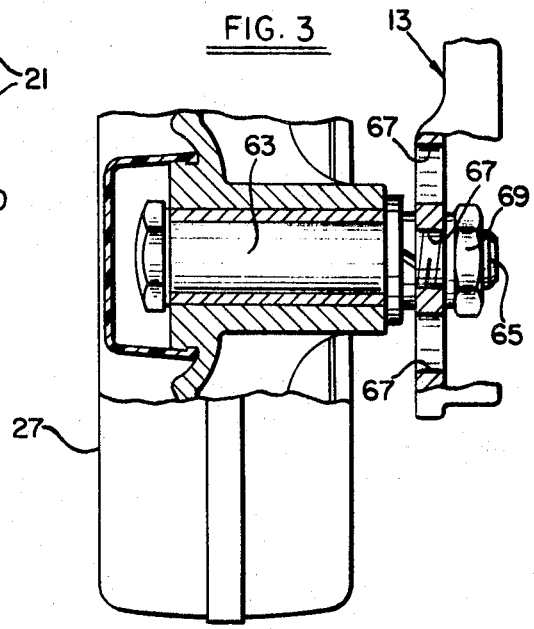
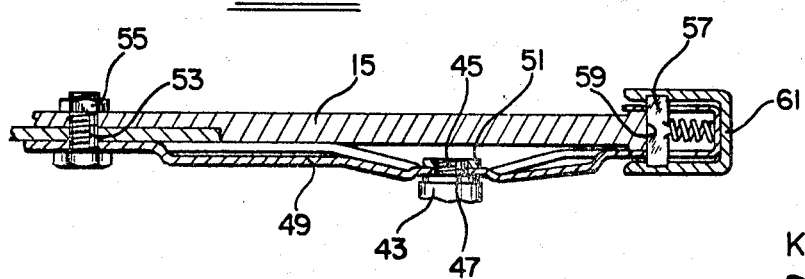
INVENTOR
KENNETH R. WELLS
BY
ATTORNEY

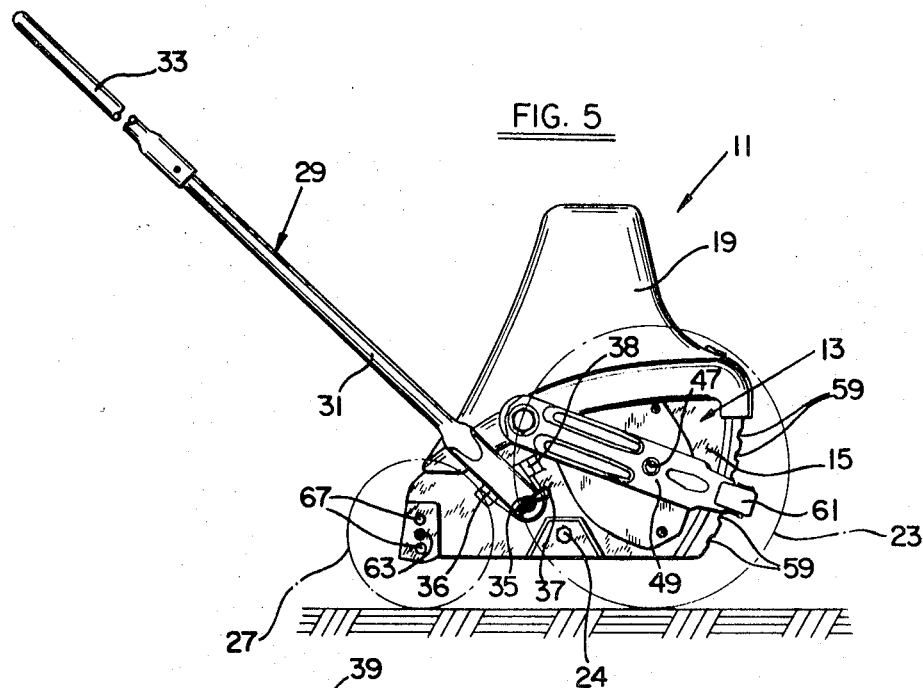
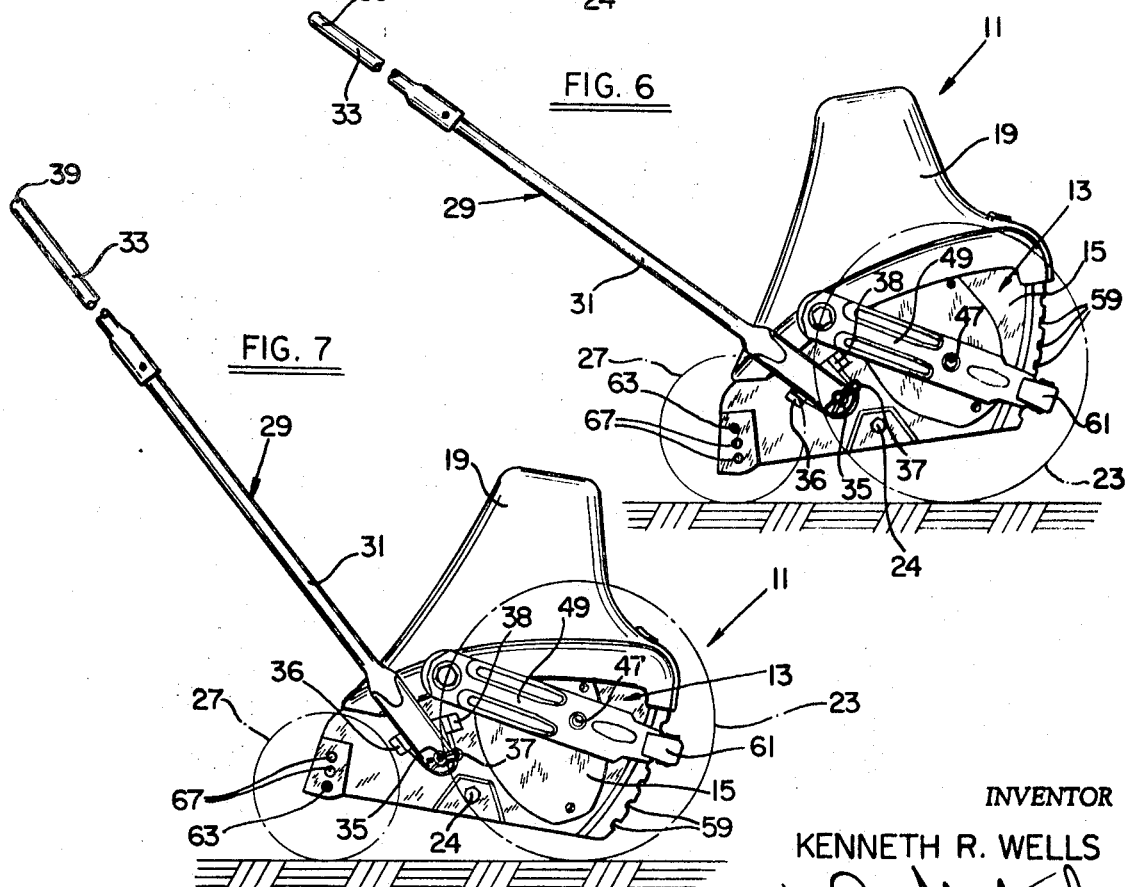

United States Patent Office 3,619,998
Patented Nov. 16, 1971

3,619,998
HANDLE HEIGHT ADJUSTMENT
Kenneth R. Wells, Joppa, Md., assignor to The Black and Decker Manufacturing Company, Towson, Md.
Filed Feb. 9, 1970, Ser. No. 9,573
Int. Cl. A01d 55/20
U.S. Cl. 56—249                    5 Claims

ABSTRACT OF THE DISCLOSURE

A lawn mower including a housing supported by wheels for movement over the ground. A reel is rotatably supported upon the housing and is driven by a motor also on the housing. The mower is manipulated and controlled by an upstanding handle on the housing. The cutting height of the reel is adjusted by adjusting the wheels relative to the housing and a novel means and arrangement is provided whereby a range of handle heights are provided for the different cutting heights.

SUMMARY OF THE INVENTION

The present invention is directed to a wheel supported mobile, over-the-ground device manipulated by an upstanding handle, wherein the wheels are adjustable to vary the height of that device relative to the ground, and wherein means is provided to maintain constant (or stabilize) the height of the handle for the different heights of the device. This is useful, for example, in a reel-type lawn mower where different cutting heights with the same handle height is desired. Also, the invention contemplates a range of these stabilized handle heights for the different cutting heights to provide maximum comfort and control for different users. Furthermore, all of this is achieved with a minimum of parts and facilitates relatively easy operation and maintenance.

The main object of the present invention, therefore, is to provide a novel handle height adjustment for over-the-ground devices such as lawn mowers and the like, which facilitates a range of stabilized handle heights for different heights of the device relative to the ground for maximum operator comfort and mower control.

Further important objects of the present invention are to provide a handle height adjustment of the above character which includes a minimum of separate parts, is relatively inexpensive to manufacture, durable in construction, and reliable and easy in use.

Other objects and advantages of the invention will become more apparent from a consideration of the detailed description to follow taken in conjunction with the drawings annexed hereto.

BRIEF DESCRIPTION OF THE DRAWINGS

FIG. 1 is a perspective view illustrating a reel-type lawn mower embodying the present invention;

FIG. 2 is an enlarged view of a portion of FIG. 1 illustrating the structure for adjusting the mower front wheels and the mower cutting height;

FIG. 3 is an enlarged fragmentary view, partly in section, illustrating the structure for adjusting the mower rear wheels and the mower handle height;

FIG. 4 is a longitudinal sectional view of the wheel height adjustment construction of FIG. 2;

FIG. 5 is an enlarged, side elevational view of the lawn mower of FIG. 1 with the wheels shown in dot-dash lines and illustrating an intermediate cutting height and handle height;

FIG. 6 is a view similar to FIG. 5 but showing a raised cutting height and a lowered handle height; and FIG. 7 is a view similar to FIGS. 5 and 6 but showing a lowered cutting height and a raised handle height.

BROAD STATEMENT OF THE INVENTION

Broadly described, the present invention relates to a lawn mower comprising a housing, a reel supported upon said housing for rotation about a generally horizontal axis, front and rear means supporting said housing for movement along the ground, said front supporting means including a member disposed on either side of said reel and in substantial axial alignment therewith, said front supporting means being vertically adjustable on said housing to vary the cutting height of said reel, a handle attached to said housing rearwardly of said front supporting means and extending upwardly and rearwardly from said housing, said rear supporting means being remote from the rotational axis of said reel and being vertically adjustable relative to said housing, whereby the angle of inclination of said handle is adjusted by adjustment of said rear supporting means.

DETAILED DESCRIPTION

Referring now more specifically to the drawings, a reel-type lawn mower embodying the present invention is illustrated generally at 11 in FIG. 1 and is seen to include a housing 13 having laterally spaced side plates 15, 17. An electric motor and battery (not shown) are mounted upon the housing 13 and are covered by a detachable shroud 19. A reel 20, supported by the housing side plates 15, 17 for rotation about a horiozntal axis, is powered by the motor (not shown) and includes blades 21 which cooperate with a stationary bedknife 22 supported by bolts 24 between the housing side plates 15, 17.

The mower housing 13 is supported for movement over the ground by a pair of relatively large, front wheels 23, 25 attached to the outer sides of the side plates 15, 17, respectively, and adjacent and/or opposite sides of the reel 21, and by stabilizing means, here, a pair of rear wheels 27 (only one of which is shown) also attached to the outer sides of the plates 15, 17, respectively. A handle 29, which includes interconnected generally U-shaped members 31, 33 disposed in tandem fashion, is secured at one end by pivot pins 35 and cotter keys or retainer pins 37 to the side plates 15, 17. A pair of spaced lugs 36, 38 formed on each side plate 15, 17 have the ends of the lower handle member 31 disposed therebetween and allow limited pivotal movement of the handle 29 relative to the housing 13. The upper handle member 33 includes a hand grip portion 39 and supports an on-off switch 41 which controls the motor.

It is important that the cutting area of the lawn mower 11 defined by the reel 21 and the bedknife 22, be adjustable vertically in order to facilitate different cutting heights. Conventionally, this is achieved through adjusting the mower frame 13 (by raising or lowering certain of the wheels, rollers, support means, etc. relative to the frame). Generally, cutting height adjustment is achieved with little or no difficulty; however, what does occur is that when the cutting height is changed, so is the height or vertical position of the handle grip portion. This, in turn, can make it difficult and/or uncomfortable for the operator to manipulate and control the mower.

To overcome this, mowers of this type generally employ a handle which is pivotable upon the frame through a range of movement. However, to provide the necessary "comfort range" for operators of different height and for the different cutting heights, the pivot range of the handle would be so large that use of the mower would not be safe and the operator would have little or no control of the mower such as when pushing down or up to turn the mower and when manipulating around bushes. On the other hand, a safe or more restricted handle pivot range sacrifices comfort since the grip portion of the handle quite often will be too high or too low for the particular operator.

The present invention combines safety, comfort and control and provides a construction whereby the handle 29 is pivotable upon the housing 13 only through a relatively small operating range and whereby the height of the handle grip portion 39 is readily adjustable to the desired position for maximum comfort of and control by various operators throughout the several cutting heights.

Thus, as shown in FIGS. 2 and 4, the front wheel 23 is rotatably supported upon an axle bolt 43 having a reduced, threaded end 45 extending through an opening 47 intermediate the ends of a lever 49 and fixed thereto by a nut 51. One end of the lever 49 is pivoted to the housing side plate 15 by a bolt 53 and nut 55 while the other end carries a cross pin 57 which cooperates (in detent fashion) with vertically spaced recesses 59 formed in the side plate 15. The pin 57 is carried by a hollow cap 61 slidably disposed over the end of the lever 49. A compression spring 63 is caged between the end of the lever 49 and the cross pin 57 and normally biases the latter toward the recesses 59.

The front wheel 25 is similarly attached to the side plate 17. Thus, when desired, the operator releases the detent cross pins 57 from the associated slots 59 by pulling outwardly on the caps 61 adjacent each wheel 23, 25, whereupon the levers 49 can be pivoted upwardly or downwardly relative to the housing 13. This, in turn, raises or lowers the wheels 23, 25 relative to the housing 13 and correspondingly lowers or raises the cutting height of the reel 21. When the desired new cutting height is attained, the caps are released and the cross pins 57 enter new recesses 59.

Turning now to FIGS. 5-7, one may readily see the several cutting heights provided by this adjustment. Thus, FIG. 5 illustrates an intermediate cutting height, i.e., one where the cross pins 57 carried by the levers 47 are disposed in an intermediate one of the recesses 59. FIGS. 6 and 7, on the other hand, illustrate a relatively high and a relatively low cutting height, respectively, i.e., the cross pins 57 are in lower and upper recesses 59, respectively.

In addition to the front wheels 23, 25 being adjustable, and in accordance with the present invention, the rear wheels 27 are also vertically adjustable relative to the housing 13. As shown in FIG. 3, the wheel 27 is rotatably supported upon an axle bolt 63 which has a reduced end 65 extending through a selected one of a plurality of vertically spaced openings 67 in the side plate 15 and releasably secured thereto by a nut 69. The other rear wheel (not shown) is similarly vertically adjustable on its side plate 17 so that the rear end of the lawn mower housing 13 is raised or lowered relative to the ground by lowering or raising, respectively, the wheels 27 relative thereto.

In use, the operator sets the cutting height by adjusting the front wheels 23, 25 up or down through the levers 49 and the cooperating detent pins 57 and recesses 59. This adjusts the height of the reel 21 relative to the ground and therefore sets the cutting height of the mower. If the grip portion 39 of the handle 29 at this cutting height is comfortable for the user, no further adjustment is necessary. On the other hand, if the grip portion 39 of the handle 29 is too high or too low for the operator at this cutting height, the rear wheels 27 are then raised or lowered accordingly thereby lowering or raising the rear end of the mower housing 13 and the height of the handle grip portion 39. This adjustment of the rear wheels 27 has relatively little effect on the cutting height of the reel 21 since these wheels 27 are relatively remote from the reel 21 and the bedknife 22.

FIGS. 5, 6 and 7 illustrate intermediate, extreme low, and extreme high positions, respectively, of the handle grip portion 39, and intermediate, extreme high, and extreme low cutting heights, respectively. In FIG. 5, the wheel axles 63 are in the middle openings 67 so that the handle grip portion 39 can be raised or lowered by lowering or raising, respectively, the position of the rear wheels 27 relative to the housing 13. In FIG. 6, the wheel axles 63 are located in the uppermost openings 67 so that the handle grip portion 39 can be raised considerably by repositioning the axles 63 in one of the lower openings 67. In FIG. 7, the axles 63 are in the lowermost openings 67 so that the grip portion 39 can be lowered by repositioning these axles in one of the upper openings 67. Thus, it is seen that a relatively wide range of handle positions is available for each of the cutting height positions thereby providing maximum comfort for and control by the operator, and this is achieved with only a relatively narrow range of pivotal movement of the handle 29 as allowed by the lugs 36, 38.

It will be appreciated that the structure illustrated and described above is exemplary of and represents a preferred form of the present invention. However, various modifications, substitutions, omissions and/or additions may be made without departing from the spirit of this invention. For example, but not by way of limitation, the rear wheels 27 could be replaced by a transverse roller or a skid plate and the wheel (or wheels and roller or skid plate) can be adjusted relative to the mower housing by any convenient means.

I claim:
1. A lawn mower comprising a housing, a reel supported upon said housing for rotation about a generally horizontal axis, front and rear means supporting said housing for movement along the ground, said front supporting means including a member disposed on either side of said reel and in substantial axial alignment therewith, said front supporting means being vertically adjustable on said housing to vary the cutting height of said reel, a handle attached to said housing rearwardly of said front supporting means and extending upwardly and rearwardly from said housing, said rear supporting means being remote from the rotational axis of said reel and being vertically adjustable relative to said housing, whereby the angle of inclination of said handle is adjusted by adjustment of said rear supporting means.

2. A lawn mower as defined in claim 1 wherein said front supporting means comprises a pair of wheels rotatably supported on said housing on opposite sides of said reel.

3. A lawn mower as defined in claim 2 wherein said rear supporting means includes a pair of wheels supported on opposite sides of said housing, said rear wheels being somewhat smaller in diameter than said front wheels.

4. A lawn mower as defined in claim 1 wherein said mower includes a stationary bedknife on said housing and cooperable with said reel.

5. A lawn mower as defined in claim 1 wherein said handle is pivoted upon said housing for free movement through a limited angle.

References Cited

UNITED STATES PATENTS

| | | | |
|---|---|---|---|
| 2,915,318 | 12/1959 | Chesser | 56—17.2 X |
| 3,099,124 | 7/1963 | Strasel | 56—17.2 X |
| 2,924,055 | 2/1960 | Clemson | 56—249 X |
| 3,147,987 | 9/1964 | Ritums | 56—17.2 X |
| 3,461,656 | 8/1969 | Van Ausdall | 56—17.1 X |
| 2,490,171 | 12/1949 | Swahnberg | 280—43 |
| 2,879,074 | 3/1959 | Roberton et al. | 280—43 |
| 2,487,847 | 11/1949 | Bowen | 280—43 |
| 2,851,843 | 9/1958 | Levkoff | 56—249 X |

LOUIS G. MANCENE, Primary Examiner

D. L. WEINHOLD, Jr., Assistant Examiner